(12) United States Patent
Delfort et al.

(10) Patent No.: US 9,468,884 B2
(45) Date of Patent: Oct. 18, 2016

(54) PROCESS FOR REMOVING ACIDIC COMPOUNDS FROM A GASEOUS EFFLUENT WITH AN ABSORBENT SOLUTION BASED ON DIHYDROXYALKYLAMINES BEARING SEVERE STERIC HINDRANCE OF THE NITROGEN ATOM

(71) Applicant: IFP Energies nouvelles, Rueil-Malmaison (FR)

(72) Inventors: Bruno Delfort, Paris (FR); Dominique Le Pennec, Orgerus (FR); Julien Grandjean, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 179 days.

(21) Appl. No.: 14/355,853

(22) PCT Filed: Sep. 28, 2012

(86) PCT No.: PCT/FR2012/000388
§ 371 (c)(1),
(2) Date: May 2, 2014

(87) PCT Pub. No.: WO2013/068656
PCT Pub. Date: May 16, 2013

(65) Prior Publication Data
US 2014/0290483 A1    Oct. 2, 2014

(30) Foreign Application Priority Data
Nov. 9, 2011  (FR) ...................... 11 03409

(51) Int. Cl.
*B01D 53/14*  (2006.01)

(52) U.S. Cl.
CPC ....... *B01D 53/1493* (2013.01); *B01D 53/1468* (2013.01); *B01D 53/1481* (2013.01); *B01D 53/1462* (2013.01); *B01D 2252/20405* (2013.01); *B01D 2252/20426* (2013.01); *B01D 2252/20431* (2013.01); *B01D 2252/20489* (2013.01); *B01D 2256/24* (2013.01);
(Continued)

(58) Field of Classification Search
CPC .......... B01D 2252/20405; B01D 2252/20426; B01D 2252/20431; B01D 2252/20489; B01D 2256/24; B01D 2257/304; B01D 2257/504; B01D 2258/02; B01D 2258/0283; B01D 2258/0291; B01D 2258/05; B01D 53/1462; B01D 53/1468; B01D 53/1481; B01D 53/1493
See application file for complete search history.

(56) References Cited

U.S. PATENT DOCUMENTS

| | | |
|---|---|---|
| 4,217,237 A | 8/1980 | Sartori et al. |
| 4,405,581 A | 9/1983 | Savage et al. |

(Continued)

FOREIGN PATENT DOCUMENTS

| | | |
|---|---|---|
| EP | 0087208 A1 | 8/1983 |
| EP | 2468385 A2 | 6/2012 |

(Continued)

*Primary Examiner* — Duane Smith
*Assistant Examiner* — Cabrena Holecek
(74) *Attorney, Agent, or Firm* — Fitch, Even, Tabin & Flannery, LLP

(57) ABSTRACT

The method for eliminating acidic compounds contained in a gaseous effluent consists of placing into contact, in column C1, a gaseous effluent 1 with an absorbent solution 4 comprising an aqueous solution of one or a plurality of dihydroxyalkylamines having one of the formulas (I) and (II).

11 Claims, 1 Drawing Sheet

(52) U.S. Cl.
CPC ... *B01D2257/304* (2013.01); *B01D 2257/504* (2013.01); *B01D 2258/02* (2013.01); *B01D 2258/0283* (2013.01); *B01D 2258/0291* (2013.01); *B01D 2258/05* (2013.01)

(56) References Cited

U.S. PATENT DOCUMENTS

| | | |
|---|---|---|
| 4,405,811 A | 9/1983 | Stogryn et al. |
| 8,034,166 B2 | 10/2011 | Asprion et al. |
| 2010/0037775 A1* | 2/2010 | Siskin ............... B01D 53/1493 95/235 |
| 2012/0294785 A1* | 11/2012 | Murai ............... B01D 53/1475 423/210 |

FOREIGN PATENT DOCUMENTS

| | | | |
|---|---|---|---|
| FR | 2380062 A1 | 9/1978 | |
| GB | 1238696 A | 7/1971 | |
| GB | 2191419 A | 12/1987 | |
| JP | WO 2011121633 A1 * | 10/2011 | ......... B01D 53/1475 |
| KR | 20110001741 A | 1/2011 | |
| WO | 2011/121633 A1 | 10/2011 | |

* cited by examiner

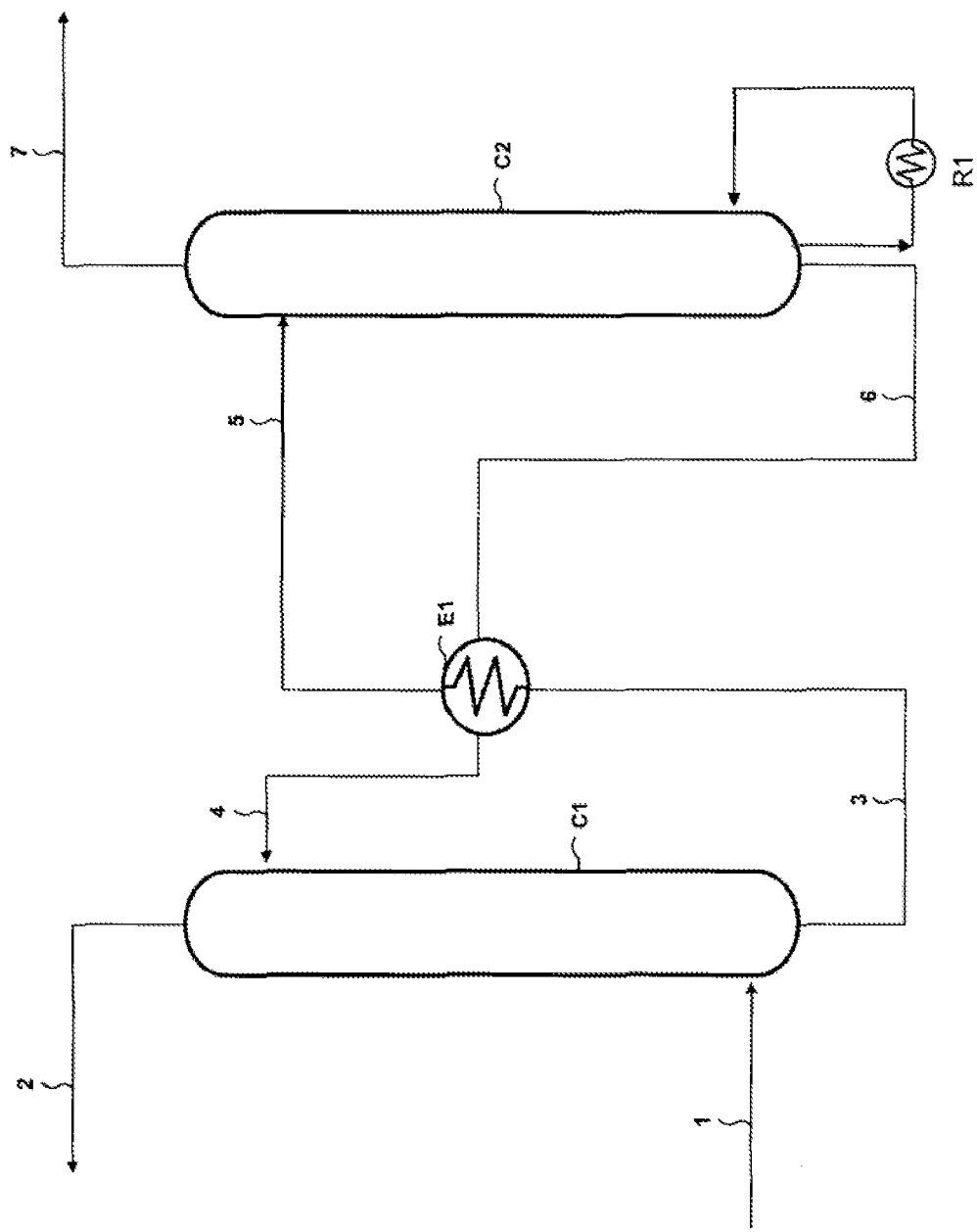

PROCESS FOR REMOVING ACIDIC COMPOUNDS FROM A GASEOUS EFFLUENT WITH AN ABSORBENT SOLUTION BASED ON DIHYDROXYALKYLAMINES BEARING SEVERE STERIC HINDRANCE OF THE NITROGEN ATOM

BACKGROUND OF THE INVENTION

The present invention relates to the field of processes for the deacidification of a gaseous effluent. The invention advantageously applies to the treatment of gases of industrial origin and natural gas.

Absorption processes involving an aqueous solution of amines are commonly used for removing acidic compounds (especially $CO_2$, $H_2S$, COS, $CS_2$, $SO_2$ and mercaptans) present in a gas. The gas is deacidified by placing it in contact with the absorbent solution, and the absorbent solution is then thermally regenerated. For example, document U.S. Pat. No. 6,852,144 describes a method for removing acidic compounds from hydrocarbons. The method uses a water-N-methyldiethanolamine or water-triethanolamine absorbent solution containing a high proportion of a compound belonging to the following group: piperazine and/or methylpiperazine and/or morpholine.

One limitation of the absorbent solutions commonly used in deacidification applications is an insufficient absorption selectivity for $H_2S$ relative to $CO_2$. Specifically, in certain cases of deacidification of natural gas, selective removal of $H_2S$ while limiting to the maximum the absorption of $CO_2$ is sought. This constraint is particularly important for gases to be treated already containing a $CO_2$ content that is less than or equal to the desired specification. Maximum $H_2S$ absorption capacity with maximum absorption selectivity for $H_2S$ with respect to $CO_2$ is then sought. This selectivity makes it possible to maximize the amount of treated gas and to recover at the regenerator outlet an acidic gas having the highest possible concentration of $H_2S$, which limits the size of the sulfur chain units downstream of the treatment and ensures better functioning. In certain cases, an $H_2S$ enrichment unit is necessary to concentrate with $H_2S$ the acidic gas. In this case, the most selective amine is also sought. Tertiary amines, such as N-methyldiethanolamine, or hindered amines which have slow kinetics of reaction with $CO_2$, are commonly used, but have selectivities limited to high $H_2S$ charge levels.

Another limitation of the absorbent solutions commonly used in total deacidification applications is excessively slow $CO_2$ or COS uptake kinetics. In the case where the desired specifications on $CO_2$ or COS are very rigorous, the fastest possible reaction kinetics are sought so as to reduce the height of the absorption column, this equipment under pressure, typically at between 20 and 90 bar, representing a sizeable part of the investment costs of the process.

Whether maximum $CO_2$ and COS uptake kinetics in a total deacidification application or minimum $CO_2$ uptake kinetics in a selective application are sought, it is always desired to use an absorbent solution having the highest possible cyclic capacity. This cyclic capacity, noted $\Delta_\alpha$, corresponds to the difference in charge rate ($\alpha$ denoting the number of moles of acidic compounds absorbed $n_{acidic\ gas}$ per kilogram of absorbent solution) between the absorbent solution feeding the absorption column and the absorbent solution withdrawn at the bottom of said column. Specifically, the greater the cyclic capacity of the absorbent solution, the lower the flow rate of absorbent solution needed to deacidify the gas to be treated. In gas treatment processes, reducing the flow rate of absorbent solution also has a strong impact on the reduction of the investments, especially as regards the dimensioning of the absorption column.

Another fundamental aspect of operations for treating industrial gases or fumes with solvent remains the regeneration of the separating agent. Depending on the type of absorption (physical and/or chemical), regeneration by pressure reduction and/or by distillation and/or by entrainment with a vaporized gas known as a "stripping gas" is generally envisioned.

Another limitation of the absorbent solutions commonly used at the present time is an excessively high energy consumption necessary for regenerating the solvent. This is particularly true in the case where the partial pressure of the acidic gases is low. For example, for an aqueous solution of 2-aminoethanol (or monoethanolamine or ethanolamine or MEA) at 30% by weight used for the post-combustion uptake of $CO_2$ in power station fumes, where the partial pressure of $CO_2$ is of the order of 0.12 bar, the regeneration energy represents about 3.7 GJ per ton of $CO_2$ taken up. Such an energy consumption represents a considerable operating cost for the $CO_2$ uptake process.

It is well known to those skilled in the art that the energy required for regeneration by distillation of a solution of amine can be broken down into three different posts: the energy required to heat the solvent between the top and the bottom of the regenerator, the energy required to lower the partial pressure of acidic gas in the regenerator by vaporization of a stripping gas, and finally the energy required to break the chemical bond between the amine and $CO_2$.

These first two posts are inversely proportional to the flow rates of absorbent solution that it is necessary to circulate in a unit in order to achieve a given specification. To reduce the energy consumption associated with the regeneration of the solvent, it is thus once again preferable to maximize the cyclic capacity of the solvent.

It is difficult to find compounds, or a family of compounds, that enable the various deacidification processes to function at reduced operating costs (including the regeneration energy) and investment costs (including the cost of the absorption column).

It is well known to those skilled in the art that tertiary amines or secondary amines with severe steric hindrance have slower $CO_2$ uptake kinetics than sparingly hindered primary or secondary amines. On the other hand, tertiary or secondary amines with severe steric hindrance have instantaneous $H_2S$ uptake kinetics, which makes it possible to achieve a selective removal of $H_2S$ based on different kinetic performance qualities.

Among the applications of secondary amines with severe steric hindrance, document U.S. Pat. No. 4,405,581 describes a process for the selective absorption of sulfureous gases with an absorber containing secondary monoamines bearing severe steric hindrance, at least one of the substituents of which is a hydroxyalkyl group.

Document U.S. Pat. No. 4,405,811 describes a process for the selective removal of $H_2S$ in gases containing $H_2S$ and $CO_2$ with an absorber containing tertiary monoamines bearing severe steric hindrance, at least one of the substituents of which is a hydroxyalkyl group.

SUMMARY OF THE INVENTION

The inventors have discovered that tertiary or secondary monoamines bearing severe steric hindrance, at least one of the substituents of which is a hydroxyalkyl group, are not equivalent in terms of performance qualities for their use in formulations of absorbent solution for the treatment of acidic gases in an industrial process.

One subject of the present invention is the use of tertiary or secondary monoamines bearing severe steric hindrance and belonging to the family of di(hydroxyalkyl)monoamines.

In general, the present invention describes a process for removing acidic compounds contained in a gaseous effluent, in which a step of absorption of the acidic compounds is performed by placing the gaseous effluent in contact with absorbent solution comprising:
water
at least one nitrogenous compound chosen from di(hydroxyalkyl)monoamines corresponding to one of the formulae (I) and (II) below:
formula (I) being

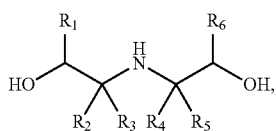

in which
R1 and R6 are independently chosen from a hydrogen atom and an alkyl radical containing from 1 to 4 carbon atoms, and
R2, R3, R4 and R5 are chosen without preference from a hydrogen atom and an alkyl radical containing from 1 to 4 carbon atoms, on condition that at least two of the radicals chosen from R2, R3, R4 and R5 are independently chosen from alkyl radicals containing from 1 to 4 carbon atoms, formula (II) being

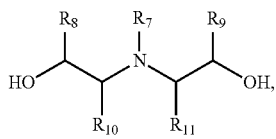

in which
R7 is an alkyl radical containing between 1 and 4 carbon atoms,
R8 and R9 are independently chosen from a hydrogen atom and an alkyl radical containing from 1 to 4 carbon atoms, and
R10 and R11 are independently chosen from a hydrogen atom and an alkyl radical containing from 1 to 4 carbon atoms, on condition that at least one of the radicals R10 or R11 is an alkyl radical containing between 1 and 4 carbon atoms.

According to the invention, the nitrogenous compound may be chosen from the following compounds:
N-(2'-hydroxyethyl)-2-amino-2-methyl-1-propanol

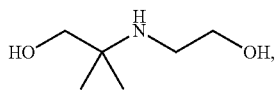

N-(2'-hydroxypropyl)-2-amino-2-methyl-1-propanol

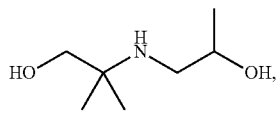

N-(2'-hydroxybutyl)-2-amino-2-methyl-1-propanol

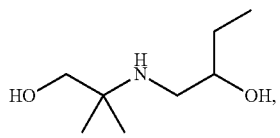

and
(N-methyl-N-hydroxyethyl)-3-amino-2-butanol

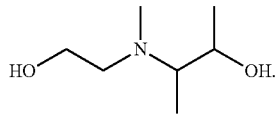

The absorbent solution may comprise between 10% and 90% by weight of the said nitrogenous compound and between 10% and 90% by weight of water.

The absorbent solution may also comprise a non-zero amount, less than 20% by weight, of a primary or secondary amine.

Said primary or secondary amine may be chosen from the group consisting of:
monoethanolamine,
N-butylethanolamine,
aminoethylethanolamine,
diglycolamine,
piperazine,
N-(2-hydroxyethyl)piperazine,
N-(2-aminoethyl)piperazine,
morpholine,
3-(methylamino)propylamine,
1,6-hexanediamine,
N,N'-dimethyl-1,6-hexanediamine.

The absorbent solution may also comprise a physical solvent chosen from methanol and sulfolane.

The step of absorption of the acidic compounds may be performed at a pressure of between 1 bar and 120 bar, and at a temperature of between 20° C. and 100° C.

After the absorption step, a gaseous effluent that is depleted in acidic compounds and an absorbent solution charged with acidic compounds may be obtained, and at least one step of regeneration of the absorbent solution charged with acidic compounds may be performed.

The regeneration step may be performed at a pressure of between 1 bar and 10 bar and at a temperature of between 100° C. and 180° C.

The gaseous effluent may be chosen from natural gas, synthesis gases, combustion fumes, refinery gases, acidic gases derived from an amine unit, gases derived from a tail reduction unit of the Claus process, biomass fermentation gases, cement works gases and incinerator fumes.

The process according to the invention may be performed for selectively removing $H_2S$ relative to $CO_2$ from a gaseous effluent comprising $H_2S$ and $CO_2$.

The use of the di(hydroxyalkyl)monoamine compounds according to the invention makes it possible to obtain acidic gas absorption capacities that are higher than those of the reference amines.

Moreover, the compounds according to the invention show higher selectivity toward $H_2S$ than the reference amines.

BRIEF DESCRIPTION OF THE DRAWING

Other characteristics and advantages of the invention will be better understood and will emerge more clearly on reading the description given below, with reference to FIG. 1 representing a schematic diagram of an acidic gas treatment process.

DETAILED DESCRIPTION OF THE INVENTION

The present invention proposes to remove acidic compounds from a gaseous effluent by using, in aqueous solution, at least one compound chosen from the group of tertiary or secondary monoamines bearing severe steric hindrance and belonging to the family of di(hydroxyalkyl) monoamines.

Composition of the Absorbent Solution

The absorbent solution used in the process according to the invention comprises:
  a—water;
  b—at least one molecule chosen from the group of tertiary or secondary monoamines bearing severe steric hindrance of the nitrogen atom and belonging to the family of di(hydroxyalkyl)monoamines.

The di(hydroxyalkyl)monoamines used according to the invention are characterized by severe steric hindrance of the nitrogen atom which corresponds to the following particular condition, depending on whether the monoamine is primary or secondary:
  in the case of secondary monoamines, the steric hindrance of the nitrogen atom of the molecule is systematically reinforced by the presence of at least two alkyl groups containing 1 to 4 carbon atoms which are linked to one of the carbon atoms located alpha to the nitrogen atom or is systematically reinforced by the presence of at least two alkyl groups containing 1 to 4 carbon atoms, each of the two alkyl groups being linked to a carbon atom located on either side alpha and alpha' to the nitrogen atom;
  in the case of tertiary monoamines, the steric hindrance of the nitrogen atom of the molecule is systematically reinforced by the presence of at least one alkyl group containing 1 to 4 carbon atoms which is linked to one of the carbon atoms located alpha to the nitrogen atom.

The secondary di(hydroxyalkyl)monoamines used according to the invention correspond to the following general formula:

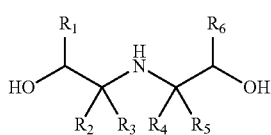

(I)

in which
R1 and R6 are independently chosen from a hydrogen atom and an alkyl radical containing from 1 to 4 carbon atoms. Preferably, R1 and R6 are independently chosen from a hydrogen atom, a methyl radical and an ethyl radical.

R2, R3, R4 and R5 are independently chosen from a hydrogen atom and an alkyl radical containing from 1 to 4 carbon atoms, on the imperative condition that at least two of the radicals chosen from R2, R3, R4 and R5 are independently chosen from alkyl radicals containing from 1 to 4 carbon atoms. It is this condition which defines severe steric hindrance of the nitrogen atom of a secondary monoamine according to the invention.

Preferably, R2, R3, R4 and R5 are independently chosen from a hydrogen atom, a methyl radical and an ethyl radical, on the imperative condition that at least two of the radicals chosen from R2, R3, R4 and R5 are independently chosen from a methyl radical and an ethyl radical. Preferably, two radicals from among R2, R3, R4 and R5 are hydrogen atoms and two radicals chosen from R2, R3, R4 and R5 are independently chosen from a methyl radical and an ethyl radical.

Preferably, the absorbent solution used according to the invention comprises the compounds covered by formula (I) mentioned below:
N-(2'-hydroxyethyl)-2-amino-2-methyl-1-propanol

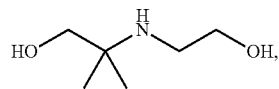

N-(2'-hydroxypropyl)-2-amino-2-methyl-1-propanol

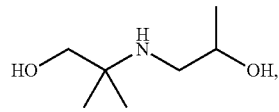

and
N-(2'-hydroxybutyl)-2-amino-2-methyl-1-propanol

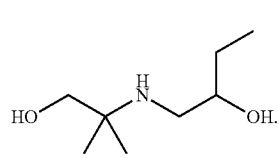

The tertiary dihydroxyalkylamines used according to the invention correspond to the following general formula:

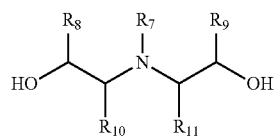

(II)

in which
R7 is imperatively an alkyl radical containing from 1 to 4 carbon atoms, and preferably a methyl radical or an ethyl radical.

R8 and R9 are independently chosen from a hydrogen atom and an alkyl radical containing from 1 to 4 carbon atoms. Preferably, R8 and R9 are independently chosen from a hydrogen atom, a methyl radical and an ethyl radical.

R10 and R11 are independently chosen from a hydrogen atom and an alkyl radical containing from 1 to 4 carbon atoms, on the imperative condition that at least one of the radicals R10 or R11 is an alkyl radical containing from 1 to 4 carbon atoms. It is this condition combined with the definition of R7 which defines severe steric hindrance of the nitrogen atom of a tertiary monoamine according to the invention.

Preferably, R10 and R11 are independently chosen from a hydrogen atom, a methyl radical and an ethyl radical, on the imperative condition that at least one of the radicals R10 or R11 is a methyl radical or an ethyl radical. Preferably, one of the radicals R10 or R11 is a hydrogen atom and one of the radicals R10 or R11 is a methyl radical or an ethyl radical.

Preferably, the absorbent solution used according to the invention comprises the compound covered by formula (I) mentioned below:
(N-methyl-N-hydroxyethyl)-3-amino-2-butanol

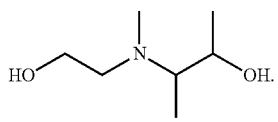

The amines according to the general formula (I) or (II) may be in variable concentration in the absorbent solution, for example between 10% and 90% by weight, preferably between 20% and 60% by weight and very preferably between 30% and 50% by weight.

The absorbent solution may contain between 10% and 90% by weight of water, preferably between 40% and 80% by weight of water, and very preferably from 50% to 70% of water.

In one embodiment, the amines according to the general formula (I) or (II) may be formulated with a compound containing at least one primary or secondary amine function. For example, the absorbent solution comprises up to a concentration of 20% by weight, preferably less than 15% by weight and preferably less than 10% by weight of said compound containing at least one primary or secondary amine function. Preferably, the absorbent solution comprises at least 0.5% by weight of said compound containing at least one primary or secondary amine function. Said compound makes it possible to accelerate the kinetics of absorption of the COS and, in certain cases, of the $CO_2$ contained in the gas to be treated.

A non-exhaustive list of compounds containing at least one primary or secondary amine function that can be included in the formulation is given below:
monoethanolamine,
N-butylethanolamine,
aminoethylethanolamine,
diglycolamine,
piperazine,
N-(2-hydroxyethyl)piperazine,
N-(2-aminoethyl)piperazine,
morpholine,
3-(methylamino)propylamine,
1,6-hexanediamine,
N,N'-dimethyl-1,6-hexanediamine.

The absorbent solution may also comprise a physical solvent, for instance methanol and sulfolane.

Synthesis of a Molecule According to the General Formula of the Invention

The molecules of the invention may be synthesized according to any route permitted by organic chemistry. Among these, mention may be made, without being exhaustive, of addition reactions of primary or secondary monoalkanolamines with more or less substituted epoxides. These reactions applied to the preferred compounds of the invention are represented by the following schemes and call for certain comments.

Example of Synthesis of the Compounds Covered by Formula (I)

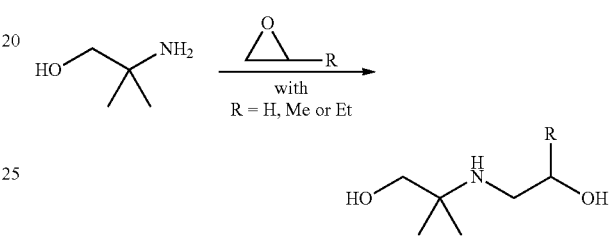

Example of Synthesis of a Compound Covered by Formula (II)

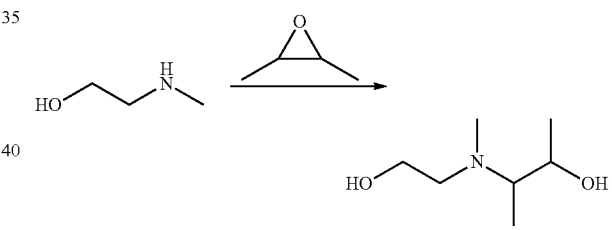

The addition reaction of a primary or secondary amine to an epoxide is a reaction that is well known in organic chemistry. It is used industrially especially for manufacturing N-methylethanolamine by reaction of methylamine and ethylene oxide. When it is desired, using a primary amine, to obtain a secondary alkanolamine by reaction with an epoxide, it is recommended to work with an excess of amine in order to disfavor the production of the double-addition compound, which would be an undesired tertiary amine. When it is desired, using a secondary amine, to obtain a tertiary alkanolamine by reaction with an epoxide, the process may be performed with equimolar amounts or with an excess of one or other of the reagents. The excesses of reagents may be separated from the desired product at the end of the reaction and recycled into the process.

The addition reaction of an amine to an epoxide is an exothermic reaction which generally requires control of the reaction temperature. It is performed, for example, between −10° C. and 140° C. according to the nature and reactivity of the amine and of the epoxide under consideration.

This reaction may be performed in the absence or presence of a solvent. When a solvent is used, it may be chosen from the conventional solvents used in organic chemistry. It may be, for example, but in a nonlimiting manner, water or an alcohol such as methanol, ethanol or isopropanol.

This reaction generally does not require any catalyst, although certain compounds such as tertiary amines, quaternary ammonium salts or metal derivatives may be used.

Nature of the Gaseous Effluents

The absorbent solutions according to the invention may be used for deacidifying the following gaseous effluents: natural gas, synthesis gases, combustion fumes, refinery gases, acidic gases derived from an amine unit, gases derived from a tail reduction unit of the Claus process, biomass fermentation gases, cement works gases, incinerator fumes. These gaseous effluents contain one or more of the following acidic compounds: $CO_2$, $H_2S$, mercaptans, COS, $CS_2$, $SO_2$.

Combustion fumes are especially produced by the combustion of hydrocarbons, biogas, coal in a boiler or for a combustion gas turbine, for example for the purpose of producing electricity. By way of illustration, the process according to the invention may be used to absorb at least 70%, preferably at least 80% or even at least 90% of the $CO_2$ contained in combustion fumes. These fumes generally have a temperature of between 20 and 60° C., a pressure of between 1 and 5 bar and may comprise between 50% and 80% nitrogen, between 5% and 40% carbon dioxide, between 1% and 20% oxygen, and a few impurities such as SOx and NOx, if they have not been removed upstream of the deacidification process. In particular, the process according to the invention is particularly suitable for absorbing $CO_2$ contained in combustion fumes comprising a low partial pressure of $CO_2$, for example a partial pressure of $CO_2$ of less than 200 mbar.

The process according to the invention may be performed for deacidifying a synthesis gas. Synthesis gas contains carbon monoxide CO, hydrogen $H_2$ (generally in an $H_2$/CO ratio equal to 2), water vapor (generally at saturation at the temperature at which the washing is performed) and carbon dioxide $CO_2$ (of the order of a few tens of percent). The pressure is generally between 20 and 30 bar, but may be up to 70 bar. It may also contain sulfureous impurities ($H_2S$, COS, etc.), nitrogenous impurities ($NH_3$, HCN) and halogenic impurities.

The process according to the invention may be performed for deacidifying a natural gas. Natural gas consists predominantly of gaseous hydrocarbons, but may contain several of the following acidic compounds: $CO_2$, $H_2S$, mercaptans, COS, $CS_2$. The content of these acidic compounds is very variable and may be up to 40% for $CO_2$ and $H_2S$. The temperature of natural gas may be between 20° C. and 100° C. The pressure of the natural gas to be treated may be between 10 and 120 bar. The invention may be performed to achieve specifications generally imposed on deacidified gas, which are less than 2% $CO_2$, or even less than 50 ppm of $CO_2$ in order subsequently to perform a liquefaction of the natural gas, and less than 4 ppm of $H_2S$, and less than 50 ppm or even less than 10 ppm, total sulfur volume.

Process for Removing Acidic Compounds from a Gaseous Effluent

The use of an aqueous solution comprising a compound according to the general formula (A) for deacidifying a gaseous effluent is performed schematically by carrying out an absorption step followed by a regeneration step, for example as represented by FIG. 1.

With reference to FIG. 1, the absorption step consists in placing the gaseous effluent 1 in contact with the absorbent solution 4. The gaseous effluent 1 is introduced into the bottom of C1, and the absorbent solution is introduced into the top of C1. Column C1 is equipped with a means for placing in contact between gas and liquid, for example bulk packing, structured packing or plates. During the contact, the amine functions of the molecules according to the general formula (A) of the absorbent solution react with the acidic compounds contained in the effluent so as to obtain a gaseous effluent that is depleted in acidic compounds 2 discharged at the top of C1 and an absorbent solution that is enriched in acidic compounds 3 discharged at the bottom of C1 to be regenerated.

The regeneration step consists especially in heating, and optionally in reducing the pressure of, the absorbent solution enriched in acidic compounds so as to release the acidic compounds in gaseous form. The absorbent solution enriched in acidic compounds 3 is introduced into the heat exchanger E1, where it is heated by the stream 6 originating from the regeneration column C2. The heated solution 5 leaving E1 is introduced into the regeneration column C2.

The regeneration column C2 is equipped with inserts for placing in contact between gas and liquid, for example plates, bulk or structured packing. The bottom of the column C2 is equipped with a reboiler R1 which provides the heat required for the regeneration by vaporizing a fraction of the absorbent solution. In the column C2, under the effect of the placing in contact of the absorbent solution arriving via 5 with the vapor produced by the reboiler, the acidic compounds are released in gaseous form and discharged at the top of C2 via the pipe 7. The regenerated absorbent solution 6, i.e. the solution depleted in acidic compounds 6, is cooled in E1 and then recycled into the column C1 via the pipe 4.

The step of absorption of the acidic compounds may be formed at a pressure in C1 of between 1 bar and 120 bar and preferably between 20 bar and 100 bar for the treatment of a natural gas, preferably between 1 bar and 3 bar for the treatment of industrial fumes, and at a temperature in C1 of between 20° C. and 100° C., preferentially between 30° C. and 90° C., or even between 30 and 60° C.

The regeneration step of the process according to the invention may be performed by thermal regeneration, optionally complemented with one or more pressure reduction steps.

The regeneration may be performed at a pressure in C2 of between 1 bar and 5 bar, or even up to 10 bar, and at a temperature in C2 of between 100° C. and 180° C. Preferably, the regeneration temperature in C2 is between 155° C. and 180° C. in the case where it is desired to reinject the acidic gases.

EXAMPLES

Example 1

Synthetic Procedure

The examples that follow illustrate the synthesis of preferred molecules of the invention according to the synthetic route described previously, it being understood that all the possibilities for the synthesis of these molecules both as regards the synthetic routes and as regards the possible procedures are not described herein.

N-(2'-Hydroxyethyl)-2-amino-2-methyl-1-propanol

To a solution of 1.68 mol of 2-amino-2-methyl-1-propanol in 150 ml of water is added with stirring, over one hour, 0.83 mol of ethylene oxide at a temperature maintained below 20° C. The water and the excess 2-methyl-2-amino- 1-propanol are then removed by distillation and the residual product is recrystallized from ethyl acetate to obtain, after drying, 72 g of N-(2'-hydroxyethyl)-2-amino-2-methyl-1-propanol, the structure of which is confirmed by NMR analysis (CDCl$_3$):
68.2 ppm: HO—CH$_2$—C(CH$_3$)$_2$—NH—CH$_2$—CH$_2$—OH
53.4 ppm: HO—CH$_2$—C(CH$_3$)$_2$—NH—CH$_2$—CH$_2$—OH
23.5 ppm: HO—CH$_2$—C(CH$_3$)$_2$—NH—CH$_2$—CH$_2$—OH
43.3 ppm: HO—CH$_2$—C(CH$_3$)$_2$—NH—CH$_2$—CH$_2$—OH
61.5 ppm: HO—CH$_2$—C(CH$_3$)$_2$—NH—CH$_2$—CH$_2$—OH N-(2'-Hydroxypropyl)-2-amino-2-methyl-1-propanol To a solution of 1.68 mol of 2-amino-2-methyl-1-propanol in 300 ml of water is added with stirring, over one hour, 0.84 mol of propylene oxide at a temperature maintained below 25° C. The water and the excess 2-methyl-2-amino-1-propanol are then removed by distillation and the residual product is recrystallized from ethyl acetate to obtain, after drying, 78 g of N-(2'-hydroxypropyl)-2-amino-2-methyl-1-propanol, the structure of which is confirmed by NMR analysis (CDCl$_3$):
68.3 ppm: HO—CH$_2$—C(CH$_3$)$_2$—NH—CH$_2$—CH(CH$_3$)—OH
53.3 ppm: HO—CH$_2$—C(CH$_3$)$_2$—NH—CH$_2$—CH(CH$_3$)—OH
23.4 and 23.8 ppm: HO—CH$_2$—C(CH$_3$)$_2$—NH—CH$_2$—CH(CH$_3$)—OH
49.0 ppm: HO—CH$_2$—C(CH$_3$)$_2$—NH—CH$_2$—CH(CH$_3$)—OH
66.6 ppm: HO—CH$_2$—C(CH$_3$)$_2$—NH—CH$_2$—CH(CH$_3$)—OH
20.8 ppm: HO—CH$_2$—C(CH$_3$)$_2$—NH—CH$_2$—CH(CH$_3$)—OH N-(2'-Hydroxybutyl)-2-amino-2-methyl-1-propanol To a solution of 1.11 mol of 2-amino-2-methyl-1-propanol in 220 ml of water is added with stirring, over two hours, 0.55 mol of 1,2-epoxybutane at a temperature maintained at 40° C. The water and the excess 2-methyl-2-amino-1-propanol are then removed by distillation, which is continued to obtain 72 g of N-(2'-hydroxybutyl)-2-amino-2-methyl-1-propanol, the structure of which is confirmed by NMR analysis (CDCl$_3$):
68.4 ppm: HO—CH$_2$—C(CH$_3$)$_2$—NH—CH$_2$—CH(CH$_2$—CH$_3$)—OH
53.3 ppm: HO—CH$_2$—C(CH$_3$)$_2$—NH—CH$_2$—CH(CH$_2$—CH$_3$)—OH
23.7 and 23.8 ppm: HO—CH$_2$—C(CH$_3$)$_2$—NH—CH$_2$—CH(CH$_2$—CH$_3$)—OH
47.0 ppm: HO—CH$_2$—C(CH$_3$)$_2$—NH—CH$_2$—CH(CH$_2$—CH$_3$)—OH
72.0 ppm: HO—CH$_2$—C(CH$_3$)$_2$—NH—CH$_2$—CH(CH$_2$—CH$_3$)—OH
27.9 ppm: HO—CH$_2$—C(CH$_3$)$_2$—NH—CH$_2$—CH(CH$_2$—CH$_3$)—OH
9.8 ppm: HO—CH$_2$—C(CH$_3$)$_2$—NH—CH$_2$—CH(CH$_2$—CH$_3$)—OH (N-Methyl-N-hydroxyethyl)-3-amino-2-butanol 1.23 mol of N-methylethanolamine and 0.62 mol of 2,3-epoxybutane are placed in an autoclave reactor and the medium is maintained at a temperature of 120° C. for 4 hours. After cooling to room temperature, distillation is performed under reduced pressure, and 78 g of (N-methyl-N-hydroxyethyl)-3-amino-2-butanol are collected, the structure of which is confirmed by NMR analysis (CDCl$_3$):
59.0 ppm: HO—CH$_2$—CH$_2$—N(CH$_3$)—CH(CH$_3$)—CH(CH$_3$)—OH
54.6 ppm: HO—CH$_2$—CH$_2$—N(CH$_3$)—CH(CH$_3$)—CH(CH$_3$)—OH
36.2 ppm: HO—CH$_2$—CH$_2$—N(CH$_3$)—CH(CH$_3$)—CH(CH$_3$)—OH
65.0 ppm: HO—CH$_2$—CH$_2$—N(CH$_3$)—CH(CH$_3$)—CH(CH$_3$)—OH
7.3 ppm: HO—CH$_2$—CH$_2$—N(CH$_3$)—CH(CH$_3$)—CH(CH$_3$)—OH
66.8 ppm: HO—CH$_2$—CH$_2$—N(CH$_3$)—CH(CH$_3$)—CH(CH$_3$)—OH
18.9 ppm: HO—CH$_2$—CH$_2$—N(CH$_3$)—CH(CH$_3$)—CH(CH$_3$)—OH Example 2

Capacity and Selectivity for Removal of H$_2$S from a Gaseous Effluent Containing H$_2$S and CO$_2$ with a Solution of Amine of Formula (I)

An absorption test at 40° C. is performed on aqueous solutions of amine in a perfectly stirred reactor that is open gas side.

For each solution, the absorption is performed in a liquid volume of 50 cm$^3$ by sparging with a gaseous stream consisting of a nitrogen:carbon dioxide:hydrogen sulfide mixture of 89:10:1 in volume proportions, at a flow rate of 30 NL/h for 90 minutes.

After the test, the H$_2$S charge obtained (α=number of moles of H$_2$S/kg of absorbent solution) and the absorption selectivity toward CO$_2$ are measured.

This selectivity S is defined in the following manner:

$$S = \frac{\alpha_{H2S}}{\alpha_{CO2}} \times \frac{(CO_2 \text{ concentration of the gaseous mixture})}{(H_2S \text{ concentration of the gaseous mixture})}$$

i.e., under the conditions of the test described here $$S = 10 \times \frac{\alpha_{H2S}}{\alpha_{CO2}}$$

By way of example, the charge and the selectivity between absorbent solutions according to the invention of N-(2'-hydroxyethyl)-2-amino-2-methyl-1-propanol, N-(2'-hydroxypropyl)-2-amino-2-methyl-1-propanol and N-(2'-hydroxybutyl)-2-amino-2-methyl-1-propanol according to formula (I), at 50% by weight in water are compared with an absorbent solution of methyldiethanolamine (MDEA) at 47% by weight in water, which constitutes the reference solvent for a selective removal of H$_2$S in gas treatment, and also with a solution of diethanolamine (DEA) at 50% by weight in water, and with a solution of 2-amino-2-methyl-1-propanol (AMP) at 35% by weight in water. The three monoamines mentioned previously, not satisfying the invention, are given for comparative purposes. MDEA is a comparative example of a tertiary di(hydroxyalkyl)monoamine, but in which all the groups $R_7$ to $R_{11}$ are hydrogen atoms. DEA is a comparative example of a secondary di(hydroxyalkyl)monoamine, but in which all the groups $R_1$ to $R_6$ are hydrogen atoms. AMP provides an example of a primary monohydroxyalkylamine with steric hindrance characterized by two methyl groups on the carbon alpha to the nitrogen. Finally, the three examples according to formula (I) are compared with an absorbent solution of tert-butylethanolamine (TBEA) at 50% by weight in water, a secondary monoamine with severe steric hindrance of the nitrogen atom according to the general formula of document U.S. Pat. No. 4,405,581, but which, since it contains only one alcohol function, is not included in formula (I) according to the invention.

| Compound | Concentration | T (° C.) | $H_2S$ charge (mol/kg) | Selectivity |
|---|---|---|---|---|
| MDEA | 47% | 40 | 0.16 | 6.3 |
| DEA | 50% | 40 | 0.16 | 1.6 |
| AMP | 35% | 40 | 0.29 | 2.1 |
| TBEA (according to the general formula of document U.S. Pat. No. 4,405,581) | 50% | 40 | 0.34 | 9.5 |
| N-(2'-Hydroxyethyl)-2-amino-2-methyl-1-propanol | 50% | 40 | 0.25 | 20.0 |
| N-(2'Hydroxypropyl)-2-amino-2-methyl-1-propanol | 50% | 40 | 0.24 | 17.7 |
| N-(2'-Hydroxybutyl)-2-amino-2-methyl-1-propanol | 50% | 40 | 0.22 | 14.4 |

This example illustrates the gains in charge and in selectivity achieved with an absorbent solution according to the invention, when compared especially with MDEA and also with DEA and AMP. The comparison with TBEA reveals a significant gain in selectivity.

Example 3

Capacity for and Selectivity of Removal of $H_2S$ from a Gaseous Effluent Containing $H_2S$ and $CO_2$ with a Solution of Amine of Formula (II)

The procedure of Example 2 is repeated, with the exception of an absorbent solution of (N-methyl-N-hydroxyethyl)-3-amino-2-butanol according to formula (II), at 50% by weight in water. This solution according to the invention is compared with an absorbent solution of methyldiethanolamine (MDEA) at 47% by weight in water, which constitutes the reference absorbent solution for a selective removal of $H_2S$ in the treatment of natural gas. MDEA is a comparative example of a tertiary di(hydroxyalkyl)monoamine, but in which all the groups $R_7$ to $R_{11}$ are hydrogen atoms. The example of the absorbent solution according to the invention is also compared with an absorbent solution of tert-butyldiethanolamine (TBDEA) at 50% by weight in water, a tertiary monoamine with severe steric hindrance of the nitrogen atom according to the general formula of document U.S. Pat. No. 4,405,811, but which is not included in the general formula (II) according to the invention. Finally, the example according to the general formula (II) is compared with an absorbent solution of N-methyl-N-(2'-hydroxyethyl)-2-amino-2-methyl-1-propanol at 50% by weight in water, this tertiary di(hydroxyalkyl)monoamine having the formula:

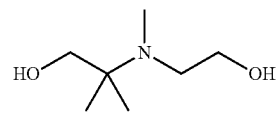

Document GB 2 191 419 A claims the use of this molecule in a process for removing sulfureous compounds in the treatment of natural gas. This tertiary di(hydroxyalkyl)monoamine is not included in the general formula (II) according to the invention.

| Compound | Concentration | T (° C.) | $H_2S$ charge (mol/kg) | Selectivity |
|---|---|---|---|---|
| MDEA | 47% | 40 | 0.16 | 6.3 |
| TBDEA (according to the general formula of document U.S. Pat. No. 4,405,811) | 50% | 40 | 0.15 | 7.6 |
| N-Methyl-N-(2'hydroxyethyl)-2-amino-2-methyl-1-propanol (according to document GB 2 191 419 A) | 50% | 40 | 0.03 | 3.78 |
| (N-Methyl-N-hydroxyethyl)-3-amino-2-butanol (according to the invention) | 50% | 40 | 0.19 | 7.6 |

This example illustrates the gains in charge and in selectivity that may be achieved with an absorbent solution according to the invention, when compared especially with MDEA and with N-methyl-N-(2'-hydroxyethyl)-2-amino-2-methyl-1-propanol.

The comparison with TBDEA reveals a gain in $H_2S$ absorption capacity for the same selectivity.

The invention claimed is:

1. A process for removing acidic compounds contained in a gaseous effluent, in which a step of absorption of the acidic compounds is performed by placing the gaseous effluent in contact with an absorbent solution comprising:
water
at least one nitrogenous compound chosen from di(hydroxyalkyl)monoamines corresponding to one of the formulae (I) and (II) below:
formula (I) being

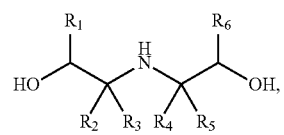

in which
R1 and R6 are independently chosen from a hydrogen atom and an alkyl radical containing from 1 to 4 carbon atoms, and
R2, R3, R4 and R5 are chosen without preference from a hydrogen atom and an alkyl radical containing from 1 to 4 carbon atoms, on conditions that at least two of the radicals chosen from R2, R3, R4 and R5 are independently chosen from alkyl radicals containing from 1 to 4 carbon atoms and that two of the at least two of the radicals chosen from R2, R3, R4, and R5 that are independently chosen from alkyl radicals containing from 1 to 4 carbon atoms are linked to one of the carbon atoms located alpha to the nitrogen atom, formula (II) being

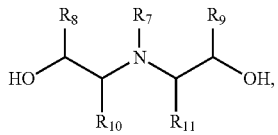

in which
R7 is an alkyl radical containing between 1 and 4 carbon atoms,
R8 and R9 are independently chosen from a hydrogen atom and an alkyl radical containing from 1 to 4 carbon atoms, and
R10 and R11 are independently chosen from a hydrogen atom and an alkyl radical containing from 1 to 4 carbon atoms, on condition that at least one of the radicals R10 or R11 is an alkyl radical containing between 1 and 4 carbon atoms.

2. The process as claimed in claim 1, in which the nitrogenous compound is chosen from the following compounds:

N-(2'-hydroxyethyl)-2-amino-2-methyl-1-propanol

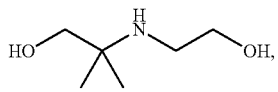

N-(2'-hydroxypropyl)-2-amino-2-methyl-1-propanol

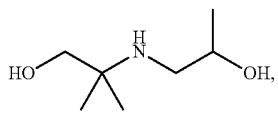

and
N-(2'-hydroxybutyl)-2-amino-2-methyl-1-propanol

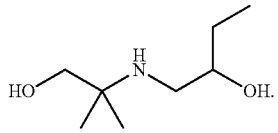

3. The process as claimed in claim 1, in which the absorbent solution comprises between 10% and 90% by weight of said nitrogenous compound and between 10% and 90% by weight of water.

4. The process as claimed in claim 1, in which the absorbent solution also comprises a non-zero amount, less than 20% by weight, of a primary or secondary amine.

5. The process as claimed in claim 4, in which said primary or secondary amine is chosen from the group consisting of:
monoethanolamine,
N-butylethanolamine,
aminoethylethanolamine,
diglycolamine,
piperazine,
N-(2-hydroxyethyl)piperazine,
N-(2-aminoethyl)piperazine,
morpholine,
3-(methylamino)propylamine,
1,6-hexanediamine,
N,N'-dimethyl-1,6-hexanediamine.

6. The process as claimed in claim 1, in which the absorbent solution also comprises a physical solvent chosen from methanol and sulfolane.

7. The process as claimed in claim 1, in which the step of absorption of the acidic compounds is performed at a pressure of between 1 bar and 120 bar and at a temperature of between 20° C. and 100° C.

8. The process as claimed in claim 1, in which, after the absorption step, a gaseous effluent that is depleted in acidic compounds and an absorbent solution that is charged in acidic compounds are obtained, and at least one step of regeneration of the absorbent solution charged with acidic compounds is performed.

9. The process as claimed in claim 1, in which the regeneration step is performed at a pressure of between 1 bar and 10 bar and at a temperature of between 100° C. and 180° C.

10. The process as claimed in claim 1, in which the gaseous effluent is chosen from natural gas, synthesis gases, combustion fumes, refinery gases, acidic gases derived from an amine unit, gases derived from a tail reduction unit of the Claus process, biomass fermentation gases, cement works gases and incinerator fumes.

11. The process as claimed in claim 1, used for the selective removal of $H_2S$ relative to $CO_2$ in a gaseous effluent comprising $H_2S$ and $CO_2$.

* * * * *